(12) United States Patent
Lin et al.

(10) Patent No.: US 8,006,107 B2
(45) Date of Patent: Aug. 23, 2011

(54) METHOD FOR REMOTE POWER CONTROL AND THE CIRCUIT THEREOF

(75) Inventors: Hung-Ming Lin, Hsinchu (TW);
Hung-Ju Huang, Hsinchu (TW);
Ya-Cheng Chen, Hsinchu (TW)

(73) Assignee: Aspeed Technology Inc., Hsinchu (TW)

( * ) Notice: Subject to any disclaimer, the term of this patent is extended or adjusted under 35 U.S.C. 154(b) by 861 days.

(21) Appl. No.: 11/937,485

(22) Filed: Nov. 8, 2007

(65) Prior Publication Data
US 2009/0125733 A1 May 14, 2009

(51) Int. Cl.
*G06F 1/00* (2006.01)
*G06F 13/00* (2006.01)
(52) U.S. Cl. .......... 713/310; 713/300; 710/100
(58) Field of Classification Search .......... 713/300; 710/8, 100
See application file for complete search history.

(56) References Cited

U.S. PATENT DOCUMENTS

| 5,675,364 A | 10/1997 | Stedman et al. |
| 5,764,547 A | 6/1998 | Bilich et al. |
| 6,125,449 A | 9/2000 | Taylor et al. |
| 2003/0035049 A1* | 2/2003 | Dickens et al. ............ 348/100 |
| 2004/0049705 A1* | 3/2004 | Liebenow ............... 713/320 |
| 2008/0162950 A1* | 7/2008 | Brown et al. ............. 713/300 |

OTHER PUBLICATIONS

How do I shut down a workstation via Remote Desktop?, Oct. 20, 2006, MSDN.*
Shimonski Robert J., Using Remote Desktop with Windows XP Professional, Dec. 7, 2004, pp. 1-11.*
Remote Desktop Protocol (RDP) Features and Performance, Jun. 2000, pp. 1-14.*

* cited by examiner

*Primary Examiner* — Mark Connolly
(74) *Attorney, Agent, or Firm* — Muncy, Geissler, Olds & Lowe, PLLC

(57) ABSTRACT

The present invention provides a remote control system for a power supply, comprising: a display data channel (DDC); a first control circuit electrically connected to said DDC, coding and sending a control signal through said DDC to control said power supply; a second control circuit electrically connected to said DDC, receiving and decoding said control signal through said DDC to control said power supply.

4 Claims, 6 Drawing Sheets

METHOD FOR REMOTE POWER CONTROL AND THE CIRCUIT THEREOF

BACKGROUND OF THE PRESENT INVENTION

1. Field of Invention

The present invention relates to a remote power control circuit, more particularly to a remote power control circuit for the DDC device (such as for display driver control) of a computer.

2. Description of Related Arts

Regarding the power regulation or controlling, it is very important for the computer and its related applied device, such as the display and the corresponding power switching system. As described a prior art in the U.S. Pat. No. 5,675,364, the computer system with communication path from the display to the host system is disclosed. It applied a basically method to implement the computer related device by power switching or saving. It majors to a host computer to apply a screen display's power using steps. The main feature as the wake up circuit is indicated inside for the computer cooperated with the display. The on-off switch with the video signal are also disclosed inside its related Figure and the specification. Also the on-off cycle is a suitable series of steps for the power control of the display. But the above system did not directly regard to the DDC display and not suitable as remote power on/off control.

As described a prior art in the U.S. Pat. No. 5,764,547, it is a power control method with the structure about a monitor and a switch combined a host computer, which the computer has a detection circuit and a soft-start power by using a method with display data having a connection to the switch to send a display activating signal and further to activate the host computer by a display data signal. Wherein the three way power switch system is included the applied method to turn on/off the an entire computer system and with one single switch. And the soft-start circuit detects the signal from a DDC (display data channel) capable monitor, and the motor having the near switch for power control. Also the power control is capable from the host computer. But the above system is not suitable for a coding signal to power on/off control to the DDC display.

As described a prior art in the U.S. Pat. No. 6,125,449, a power state control architecture is described for computer control to the motor connection with power control button with a video cable. The power state includes the on/off and intermediate state (power sleep). The system comprises a monitor, a power control switch, a power management device, wherein the power management device comprising: a detector coupling to the monitor, a controller configured to change the power state of the computer, a video cable connected to the monitor and the power control button connected on the video cable. Also the above system is not suitable for a coding signal to power on/off control to the DDC display.

Referring to FIG. 1, it illustrates the conventional computer system, including a power supply 110, a motherboard 120, and a display 130. The connection between the motherboard 120 and the display 130 is a display data channel (DDC) for communicating the graphics data between them. The motherboard 120 includes a power supply control logic 121 to control the on/off or reset of the power supply 110. The power supply control logic 121 is controlled by the power supply switch 122 or reset button 123. If a user sitting in front of the display wants to shut down or reset the computer, he/she has to presses the switch 122 or reset button 123.

Referring to FIG. 2, it is similar to FIG. 1, but there is a graphics processing unit (GPU) 140 between the motherboard 120 and the display 130. The DDC is also used for the communication for them.

No matter in which circumstances, to shut down or reset the power supply of a computer, the user has to approach to the power supply switch 122 or reset button 123, both are attached to the mainframe of a computer system by in person. If the display is not in the same room with the mainframe, or they are apart for about tens meters or even farther, it is very inconvenient for the user to shut down or reset the power supply. Therefore, there is a need to provide a new system to resolve the problem.

SUMMARY OF THE PRESENT INVENTION

The objective of the present invention is to provide a remote control system for a power supply of a computer system.

In accordance with the invention, the remote control system for a power supply, comprising: a display data channel (DDC); a first control circuit electrically connected to said DDC, coding and sending a control signal through said DDC to control said power supply; a second control circuit electrically connected to said DDC, receiving and decoding said control signal through said DDC to control said power supply.

One or part or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

DETAILED DESCRIPTION OF THE PREFERRED EMBODIMENTS

Figure 1:
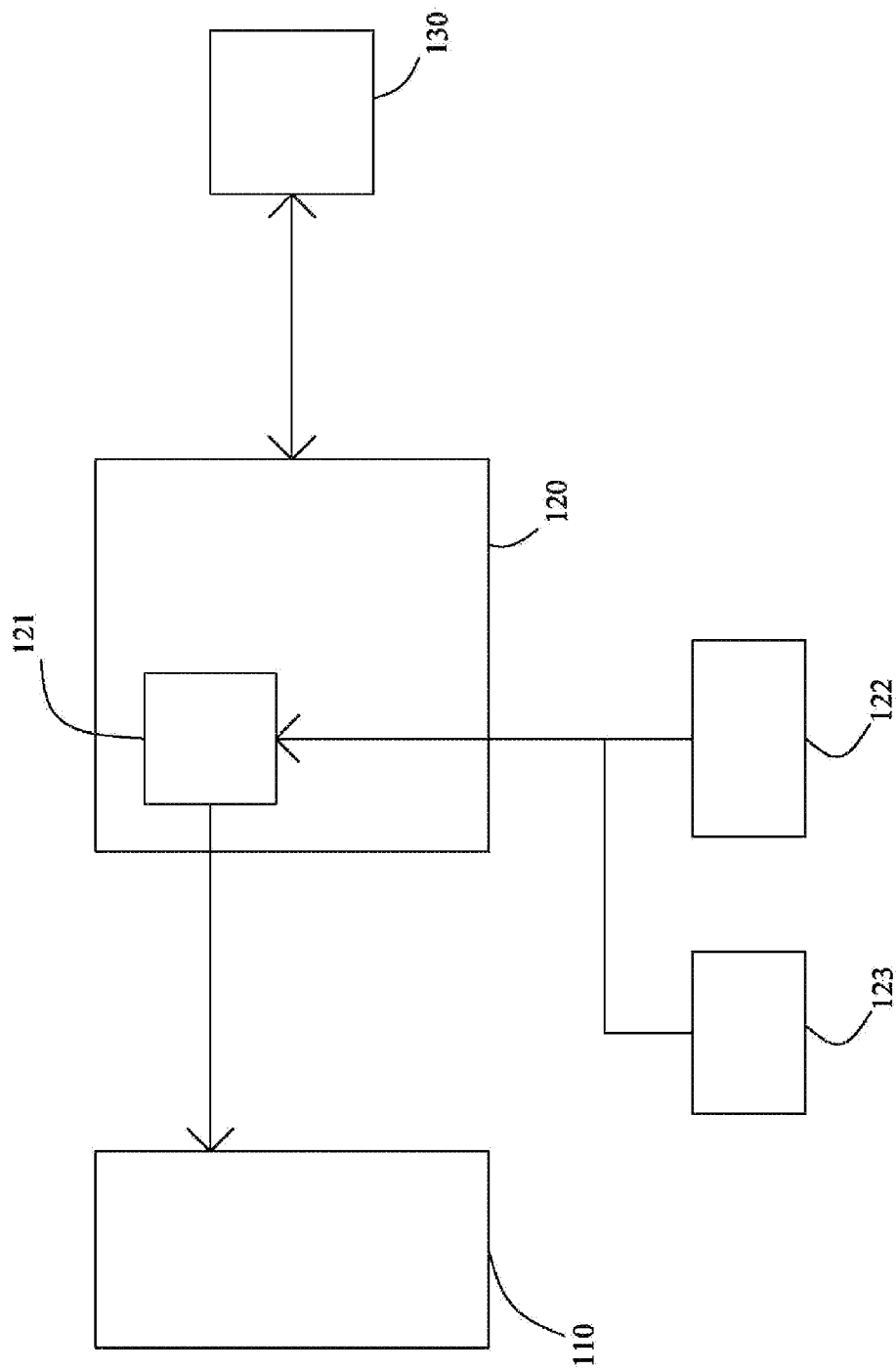
FIG. 1 illustrates an embodiment of a conventional computer system.
Figure 2:
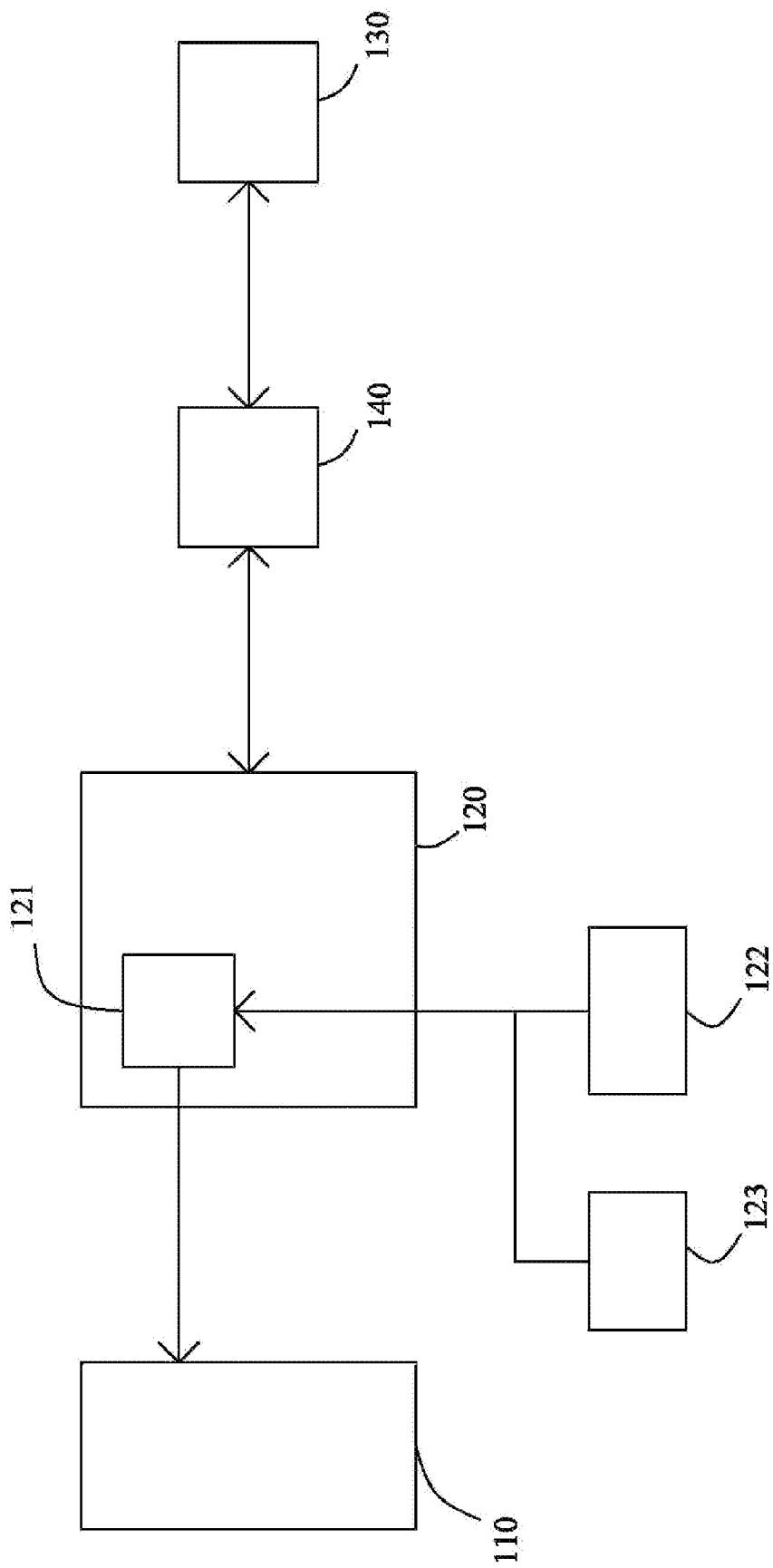
FIG. 2 illustrates the relation of conventional computer system similar to FIG. 1.
Figure 3A:
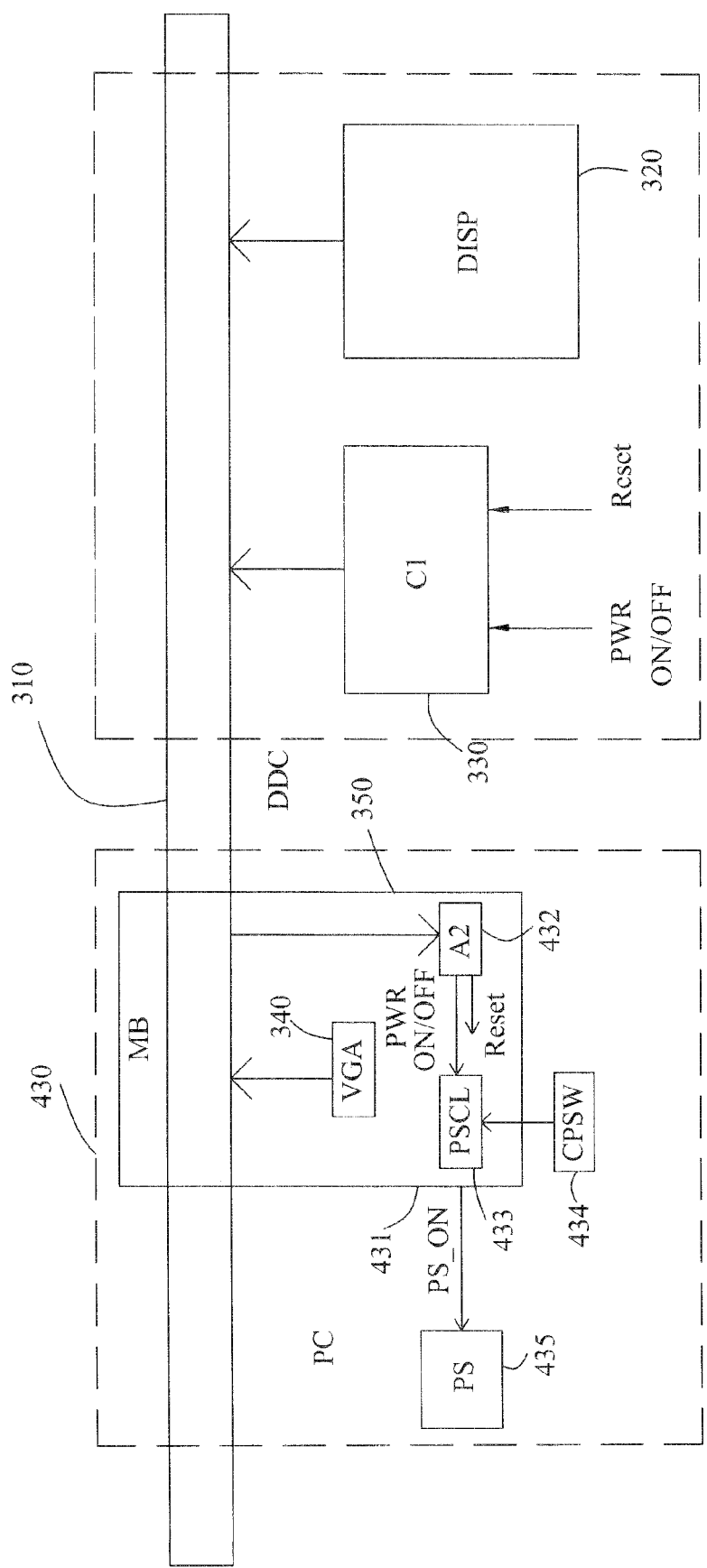
FIG. 3A illustrates the embodiment of a power control circuit of the present invention.
Figure 3B:
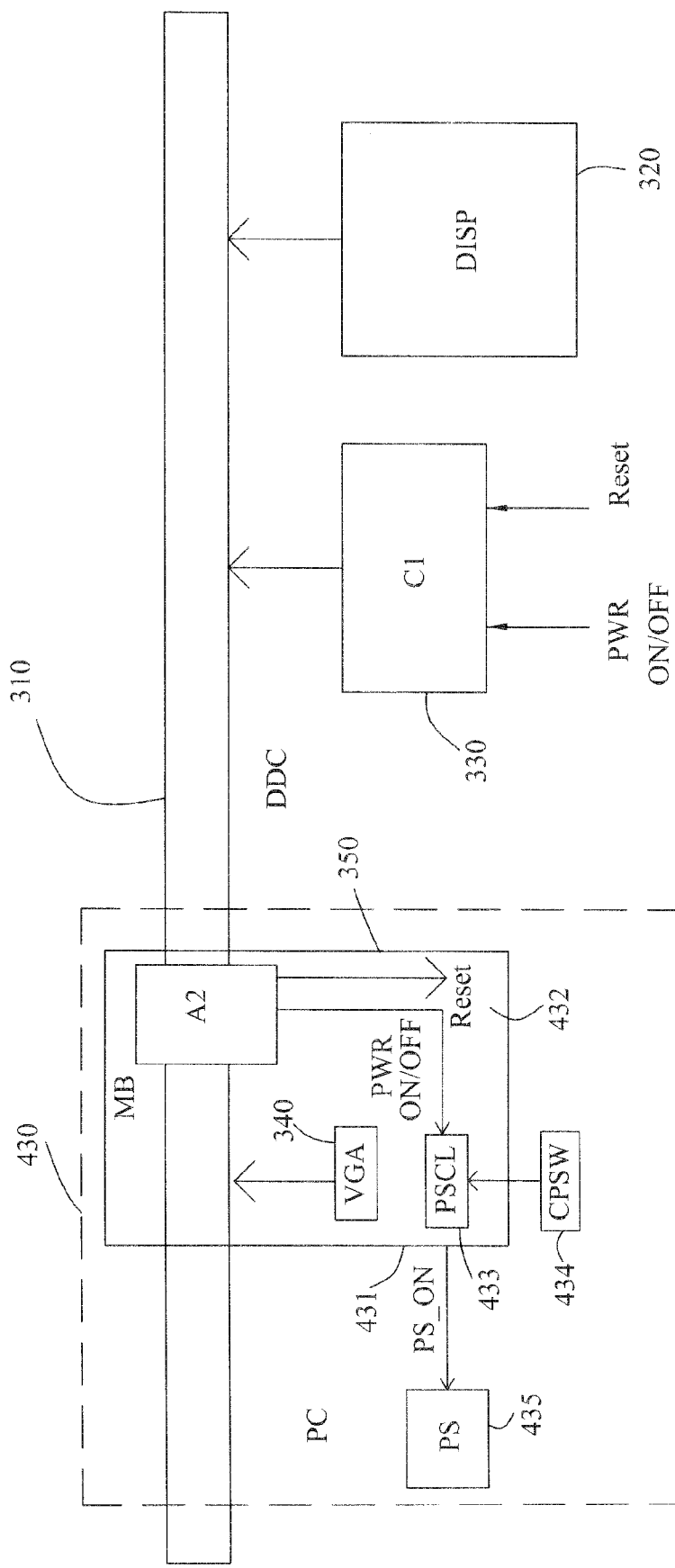
FIG. 3B illustrates another embodiment of the power control circuit of the present invention.

Referring to FIG. 3A,3B, they are two embodiments of a remote control system for a power supply. The system includes a user end and a mainframe end communicating by a DDC 310. The user end and a mainframe end may be apart for over 5 meters or in a circumstance that the user cannot approach the mainframe end without leaving the display. The user end includes a display 320 and a control circuit 330. The mainframe end includes the other control circuit 350 and a VGA chip 340.

In the present invention on FIG. 3A, the control circuit 330 works as a master device to send control signals. The user may trigger the control circuit 330 to send a control signal by pressing an input device (not shown), maybe a button. The triggered control circuit 330 codes a control signal and sends the coded control signal out through the DDC 310.

The control circuit 350 receives the coded control signal and decodes it. The control circuit 350 controls a power supply (not shown) by the decoded result, maybe power-on, power-off, or reset.

In the present invention, there are two master devices, the control circuit 330 and the VGA chip 340. In the other embodiment, if the VGA chip 340 and the display 320 cannot detect multiple masters, from FIG. 3B of the present invention the control circuit 350 has to work for bridging between the display 320 and the VGA chip 340. The control circuit 350 receives the signals sent from the VGA chip 340 and detects if there is any other signals in the DDC. If none, the control circuit 350 sends the signals received from the VGA chip 340 so as to avoid the signal collision in the DDC.

Figure 4:
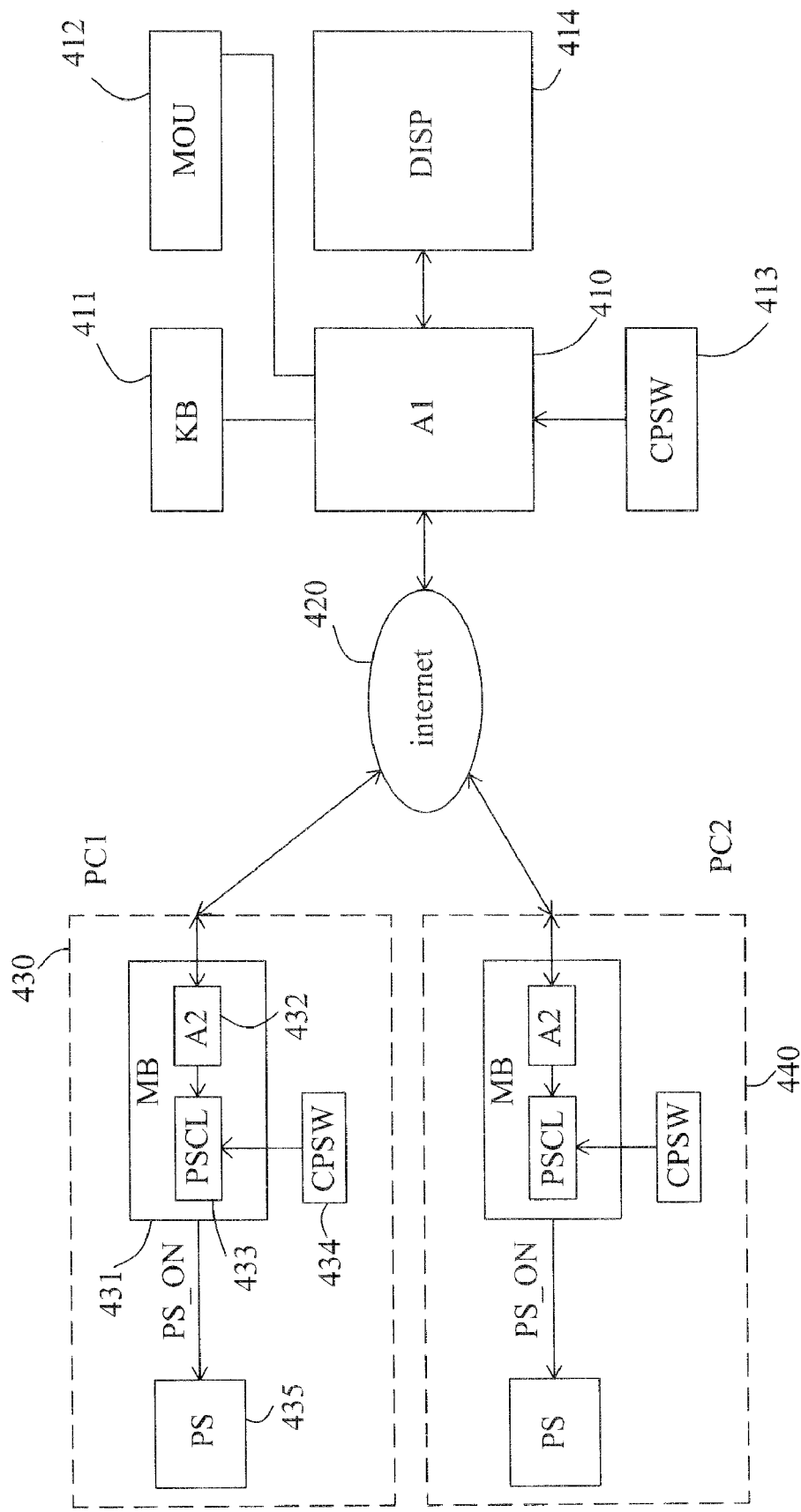
FIG. 4 illustrates how the present invention is applied to control the power supplies of multiple mainframes.

Referring to FIG. 4, it illustrates how the present invention is applied to control the power supplies of multiple mainframes. The user end includes a display 414, input devices, such as a keyboard 411 and a mouse 412, and a control circuit 410 electrically connected to all the apparatuses mentioned above. And there is a switch 413 to trigger the control circuit 410.

The mainframe ends include personal computers 430 and 440. The personal computer 430 includes a motherboard 431 and a power supply 435. The motherboard 431 includes a control circuit 432 and a power supply control logic 433. The power supply control logic 433 is triggered by the computer power switch 434. The power supply control logic 433 controls the on/off or reset of the power supply 435. The personal computer 440 are in the same architecture with the personal computer 430.

The user end and the mainframe ends are communicated through the internet 420. The user end can choose to power on/off or reset the any one of the power supply of the mainframe ends through the internet.

Figure 5:
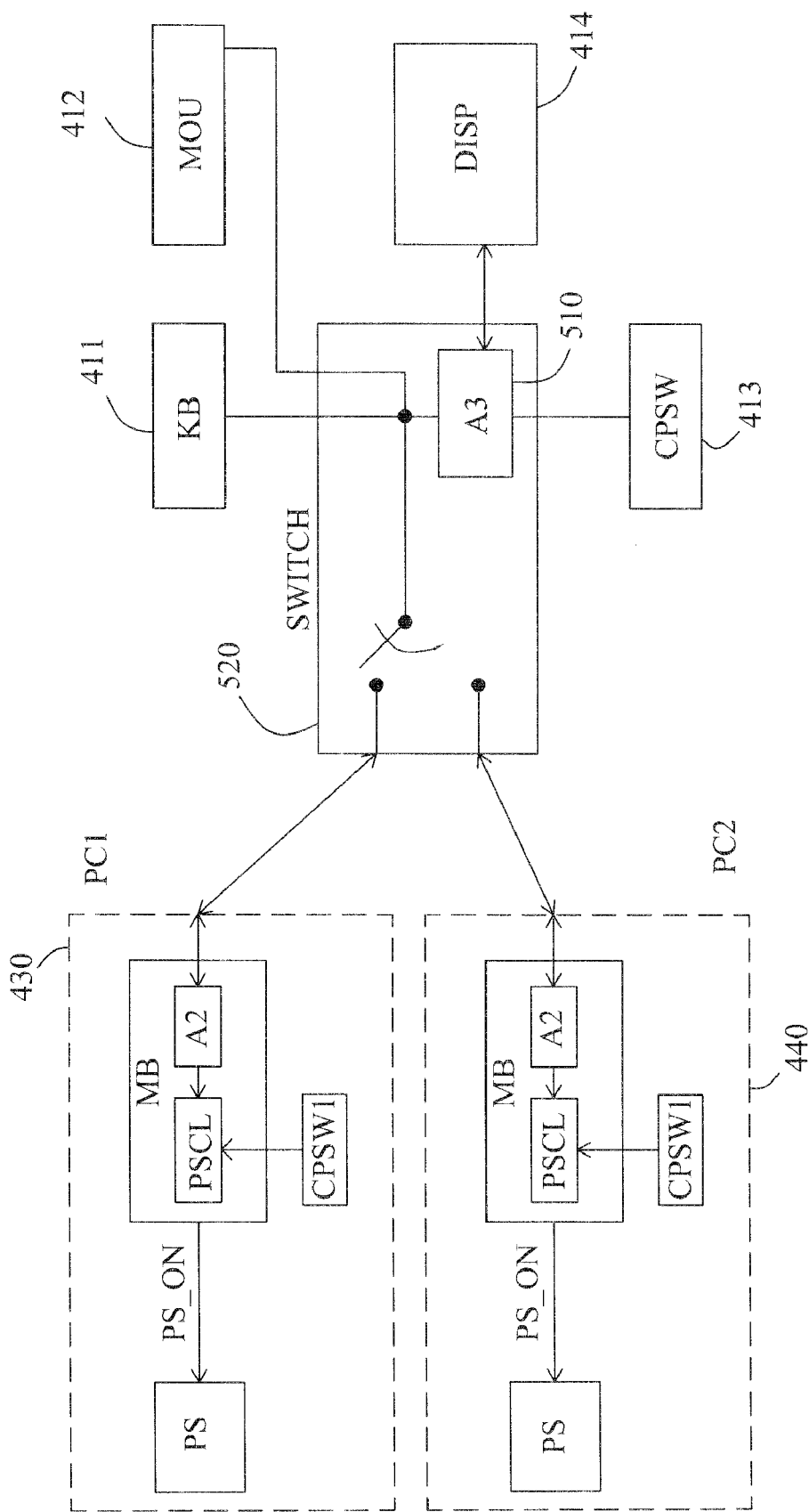
FIG. 5 illustrates of the present invention similar to FIG. 4 with a switch instead of the internet.

Referring to FIG. 5, it is similar to FIG. 4 except the control circuit 510 controls the power on/off or reset of a power supply through a switch 520 instead of the internet 420.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications which fall within the scope of the appended claims and equivalents thereof.

One skilled in the art will understand that the embodiment of the present invention as shown in the drawings and described above is exemplary only and not intended to be limiting.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A remote control system for a power supply, comprising:
   a display data channel (DDC);
   a first control circuit electrically connected to said DDC, coding and sending a control signal through said DDC;
   a second control circuit electrically connected to said DDC, receiving and decoding said control signal through said DDC to control said power supply;
   a display electrically connected to said DDC; and
   a VGA chip electrically connected to said second control circuit;
   wherein said second control circuit bridges said DDC and said VGA chip, and wherein said second control circuit receives a target signal from said VGA chip and then sends said target signal to avoid a signal collision in said DDC.

2. The remote control system according to claim 1, further comprising a switch between said first control circuit and said second control circuit.

3. The remote control system according to claim 1, wherein the second control circuit decodes said control signal to obtain a decoded result for controlling said power supply.

4. The remote control system according to claim 3, wherein the decoded result is one of a power-on state, a power-off state, and a reset state.

* * * * *